US009302887B2

(12) United States Patent
Zeiger et al.

(10) Patent No.: US 9,302,887 B2
(45) Date of Patent: Apr. 5, 2016

(54) SAFETY DEVICE FOR A PASSENGER TRANSPORT INSTALLATION

(71) Applicant: KONE Corporation, Helsinki (FI)

(72) Inventors: Heinrich Zeiger, Münster (DE); Winfried Lanzki, Unna (DE)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 14/580,487

(22) Filed: Dec. 23, 2014

(65) Prior Publication Data

US 2015/0107958 A1 Apr. 23, 2015

Related U.S. Application Data

(63) Continuation of application No. PCT/EP2013/063533, filed on Jun. 27, 2013.

(30) Foreign Application Priority Data

Jul. 10, 2012 (DE) ........................ 10 2012 013 704

(51) Int. Cl.
*B65G 29/00* (2006.01)
*B66B 29/00* (2006.01)
*G08B 21/18* (2006.01)

(52) U.S. Cl.
CPC ............... *B66B 29/00* (2013.01); *B66B 29/005* (2013.01); *G08B 21/18* (2013.01)

(58) Field of Classification Search
CPC ....... B66B 29/00; B66B 29/005; G08B 21/18
USPC .......................................................... 198/323
See application file for complete search history.

(56) References Cited

U.S. PATENT DOCUMENTS

| | | | | | |
|---|---|---|---|---|---|
| 4,175,652 | A | 11/1979 | Satou et al. | | |
| 5,361,887 | A * | 11/1994 | Zaharia | B66B 29/005 | 198/323 |
| 5,819,902 | A | 10/1998 | Schoneweiss et al. | | |
| 6,666,319 | B2 * | 12/2003 | Balzer-Apke | B66B 29/005 | 198/322 |
| 2003/0168311 | A1 | 9/2003 | Balzer-Apke et al. | | |
| 2008/0135376 | A1 * | 6/2008 | Hauser | B66B 23/14 | 198/322 |
| 2011/0011700 | A1 * | 1/2011 | Plathin | B66B 29/005 | 198/323 |
| 2012/0103756 | A1 * | 5/2012 | Braasch | B66B 25/003 | 198/323 |

FOREIGN PATENT DOCUMENTS

| | | | |
|---|---|---|---|
| CN | 101028904 | A | 9/2007 |
| DE | 296 03 962 | U1 | 7/1997 |
| DE | 196 06 317 | A1 | 8/1997 |
| DE | 100 27 490 | A1 | 12/2001 |
| DE | 10 2008 009 458 | A1 | 8/2009 |

(Continued)

*Primary Examiner* — Leslie A Nicholson, III
*Assistant Examiner* — Keith R Campbell
(74) *Attorney, Agent, or Firm* — Birch, Stewart, Kolasch & Birch, LLP

(57) ABSTRACT

A method and an apparatus for monitoring a passenger transport installation, in fact the entraining elements which establish a connection of a plate link chain to a step or pallet of the passenger transport installation. There is provided on the entraining element side a triggering element which, when a specifiable movement of the entraining element is detected or when at least one safety element is missing, triggers an alarm state and optionally halts the drive of the passenger transport installation.

20 Claims, 6 Drawing Sheets

(56) References Cited

FOREIGN PATENT DOCUMENTS

Figure 1:
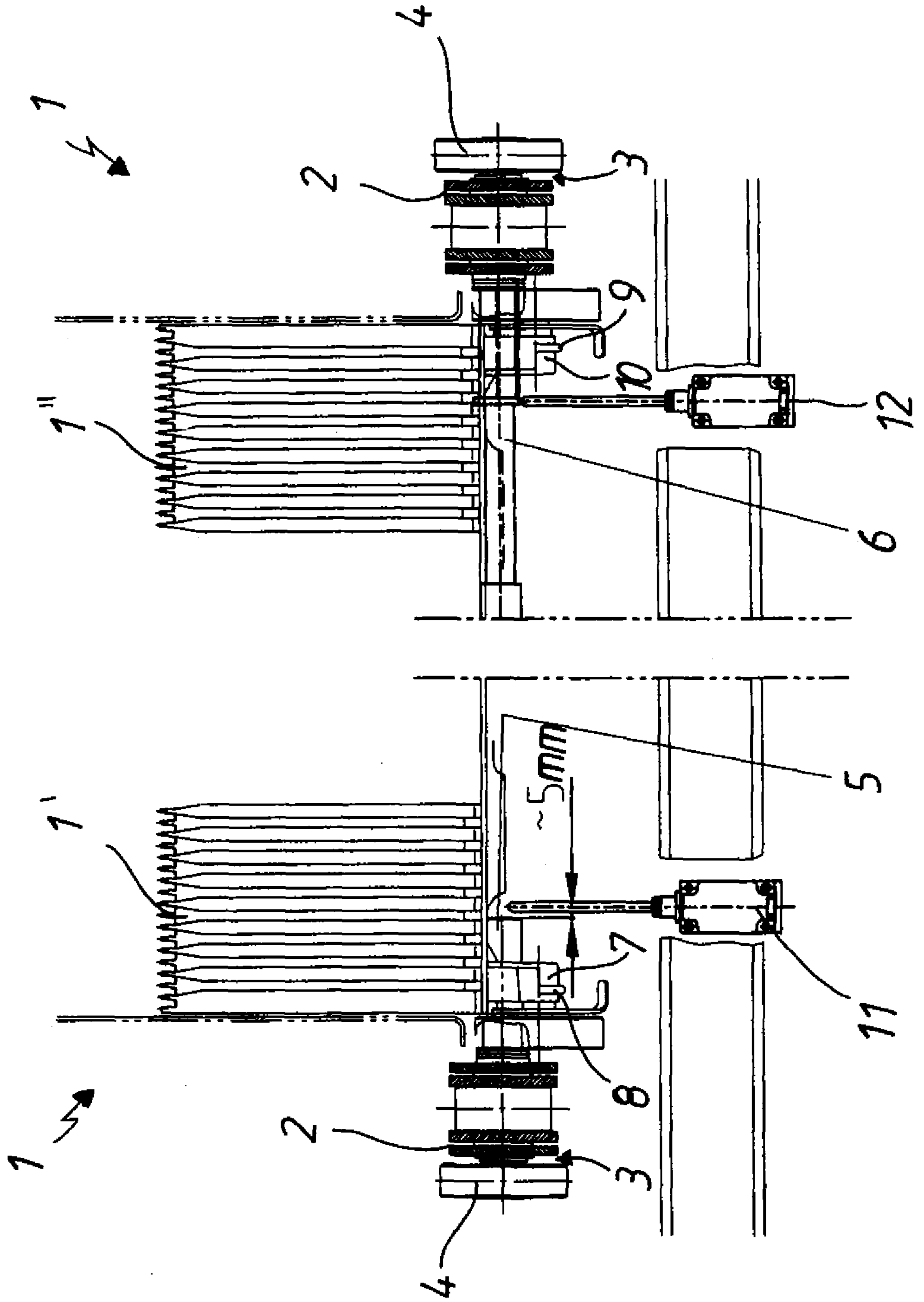

| | | | | | |
|---|---|---|---|---|---|
| JP | 63-310492 | A | | 12/1988 | |
| JP | 2007-76823 | A | | 3/2007 | |
| JP | 2008-265961 | A | | 11/2008 | |
| WO | WO 2008/032352 | A1 | | 3/2008 | |
| WO | WO 2008032352 | A1 | * | 3/2008 | ............ B66B 29/005 |

* cited by examiner

SAFETY DEVICE FOR A PASSENGER TRANSPORT INSTALLATION

CROSS REFERENCE TO RELATED APPLICATIONS

This application is a Continuation of PCT International Application No. PCT/EP2013/063533, filed on Jun. 27, 2013, which claims priority under 35 U.S.C. 119(a) to Patent Application No. 102012013704.4, filed in Germany on Jul. 10, 2012, all of which are hereby expressly incorporated by reference into the present application.

The invention relates to a safety device and to a method for safeguarding the operation of a passenger transport installation, such as for example an escalator or a moving walkway, the steps or the pallets of which are each coupled to an entraining element on a traction component, for example a drive chain.

DE 196 06 317 A1 discloses a device for monitoring the raising and/or lowering of individual steps of the step belt of escalators, the steps being provided with rollers supported on guide tracks and being held between endless drive chains provided in the region of the balustrade base, comprising at least one safety device provided substantially in the cross-over bend from the horizontal into the inclined run, in particular halting the drive of the escalator. The safety device contains at least one component mounted directly or indirectly resiliently with respect to the steps, operatively connected to a switch-off device and extending towards the steps of the step belt, said component being positioned a specifiable distance away from the continuous steps beneath the step belt, the component co-operating directly or indirectly with an apparatus provided in the region of the steps and bringing about the deflection of the component. This safety device thus detects an undesired deflection of a step from the path of travel intended for it.

With this device it is in principle possible to be able to detect the raising/lowering of individual steps within a step belt of an escalator when a load is applied to it. However, this is not possible when the step belt is not loaded, i.e. is not transporting any passengers, because if there are defects in the region of the step or pallet articulation, lowering of the respective step does not occur, rather it only occurs when subjected to a load, for example by a person. Depending on the local occurrence of the damage it may possibly be too late for detection and for the switching off of the escalator or moving walkway drive for the person triggering the incident in order to prevent personal injury.

The prior art includes a series of publications which are concerned with the general topic of "missing step detection". Reference is only made here to DE 100 27 490 A1 and DE 10 2008 009 458 A1.

In both publications the respectively used sensor checks for missing steps by it being aligned to the pins of the step or pallet rollers provided outside of the respective drive chain.

JP 2007 076 823 A shows another safety device in which the axle of the rollers of an escalator step sitting on it is monitored so that if one of these rollers is damaged, the operation of the escalator is shut down.

Therefore, these devices can not be used for this specific application, namely where a connection between components connected to one another is broken within the traction components in the operating state.

When using plate link chains as the traction component for the steps or pallets of the passenger transport installation, individual links of the plate link chain are connected to a step or pallet lug by pins. There are a number of solutions here, namely to provide on each inner side of the plate link chain in the step section a pin piece that is operatively connected to the respective step/pallet lug, or else a continuous axle extending between the two plate link chains via the step or pin lugs.

Reference is made here, for example, to DE 296 03 962 U1 which is concerned with the fitting and removal of a continuous step or pallet axle.

The entraining element being used here can be in the form of a complete or hollow pin or of a continuous axle, and it can serve to receive corresponding end regions of chain pins, by means of which the latter are then connected to the respective step or pallet component by means of the operative connection to the respective entraining element.

Independently of the type of design of the entraining element, relative movement in the respective fitting region between the respective chain pin and the corresponding entraining element is prevented structurally by safety elements, for example in the form of screws and/or safety plates, being used.

Over the course of the service life of an escalator or of a moving walkway, servicing work is carried out at regular intervals or, if required, necessary repairs are made to damaged components.

In many cases this servicing work is not carried out by the manufacturer of these escalators/moving walkways, but by subcontractors. In many cases employees are used here who are familiar with the escalator/moving walkway product in general, but do not always have training relating to the respective product or the structural design of individual components of the product. In the aforementioned activities it can therefore be the case that safety elements, as described in DE 296 03 962 U1, are possibly either not fitted at all or are only refitted carelessly during repair or maintenance work. As a result of the vibrations that occur in the operating state of the escalator/the moving walkway it can therefore be the case that safety elements that have been fitted carelessly become loose, and so there is relative movement between the aforementioned components in the chain pin/entraining element connection region, and in the worst case this can lead to the connection being broken and the respective step/pallet dropping.

It is the object of the subject matter of the invention to provide an improved method in order to guarantee the operational reliability of a passenger transport installation by eliminating the aforementioned problems that arise in the prior art.

It is therefore the object of the subject matter of the invention to be able to react to the causes of faults or to damage in the specific region of a step/pallet connection at a traction component before the damage becomes perceivable due to a faulty deflection of a step or pallet.

This object is achieved by a method according to claim 1 and by a safety device according to claim 7.

The basic idea behind the invention is to monitor the connection elements between a traction component and a step or pallet of a passenger transport installation. These connection elements relate first and foremost to an entraining element that constitutes the connection link between a drive chain and a step/pallet. The entraining element is often coupled on the chain side to a chain pin and on the step or pallet side by means of a pallet lug, in such cases both the chain pin and the pallet lug forming part of the connection elements.

According to the invention there is disposed on the entraining element side a triggering element which, when it is detected that a specifiable movement of the entraining element from its position securing the connection between the traction component and the step has taken place, or when the lack of at least one safety element is detected, triggers the alarm state, and optionally halts the drive of the passenger transport installation. Moreover, the alarm state can include the forwarding of the alarm by radio or the like to a safety or maintenance person.

One can assume that there has been a movement of the entraining element if, on the one hand, the connection between the entraining element and the chain pin and/or, on the other hand, the connection between the entraining element and the pallet lug is broken. The invention thus provides improved safety monitoring because a safety risk is detected before the step or pallet is brought out of its running position.

Advantageous further developments of the subject matter of the invention can be taken from the corresponding method subclaims 2 to 6.

The specifiable movement of the entraining element that can be detected by the triggering element can be a relative movement of the entraining element with respect to the step or pallet. In this case the triggering element is disposed on its corresponding step/pallet.

However, the triggering element can also be located stationarily within the transport section or return section, due to which the number of triggering elements required for the entire escalator or moving walkway is considerably reduced. If the triggering element is disposed within the transport section, it is advantageous to place it in the region which is not visible to the passenger.

According to one advantageous embodiment the triggering element is a mechanical button which is positioned a specifiable distance away from the respective entraining element or from its path of travel specified by the circulation of the passenger transport installation so that the button detects the dubious movement of the entraining element when the entraining element strikes the button.

In order to be able to detect the lack of an entraining element, an additional button system can be provided: there can thus be located, for example, stationary in the return section a button which a pulse transmitter element in the form of a contact plate provided on each step or pallet strikes, by means of which, when the passenger transport installation is running, a frequency signal is generated that identifies the number of detected steps per unit of time dependently upon the operating speed of the passenger transport installation. The lack of an entraining element is then detected by deviations from a predetermined frequency.

According to one alternative the triggering element can also be a sensor that works in a contact-free manner and which is aligned to the circumferential surface of the entraining element and measures its movement. If this movement exceeds a specified target value, an alarm is triggered by the safety device or optionally the drive of the passenger transport installation is halted.

The object of the invention is also achieved by a safety device for implementing the checking and monitoring process described above. The safety device has at least one triggering element that is disposed, for example, in the non-visible region of the transport and/or return section of the steps or pallets of the passenger transport installation on the entraining element side such that the triggering element triggers the alarm state if there is a movement of the respective entraining element with respect to the steps or pallet or if at least one safety element is missing. A triggering element can also be fitted to each of the individual steps or pallets, by means of which a relative movement of the entraining element with respect to the step or pallet can then be detected.

Advantageous further developments of the subject matter of the invention can be taken from the corresponding object subclaims 7-9.

Therefore, as opposed to the prior art, a safety device intended for the very specific application of a step/pallet fastening is presented which has a simple structure and is, moreover, very effective because even with small relative movements between the operatively connected components it can halt the drive of the escalator/the moving walkway.

The triggering element can be a mechanical button which is positioned a specifiable distance away from the entraining element, the button being able to halt the drive of the passenger transport installation when it comes into contact with the entraining element.

With regard to detection of axial movement of the entraining element the button can advantageously be positioned such that it comes into contact with the free end of the entraining element.

Alternatively, the triggering element can also be a sensor working in a contact-free manner, which measures a relative movement of the entraining element, and when a specifiable path of the entraining element is exceeded halts the drive of the passenger transport installation.

According to another idea behind the invention the respective triggering element is disposed in the non-visible region of the passenger transport installation.

Preferably, two triggering elements lying opposite one another between the traction components running parallel to one another are disposed at a specifiable point of the transport and/or return section of the traction component for each step or pallet.

In contrast to the prior art the respectively used triggering element is disposed within, i.e. between, the traction component(s) and so is able to monitor the connection established here between the chain pins and the entraining elements in different forms as required.

Figure 2:
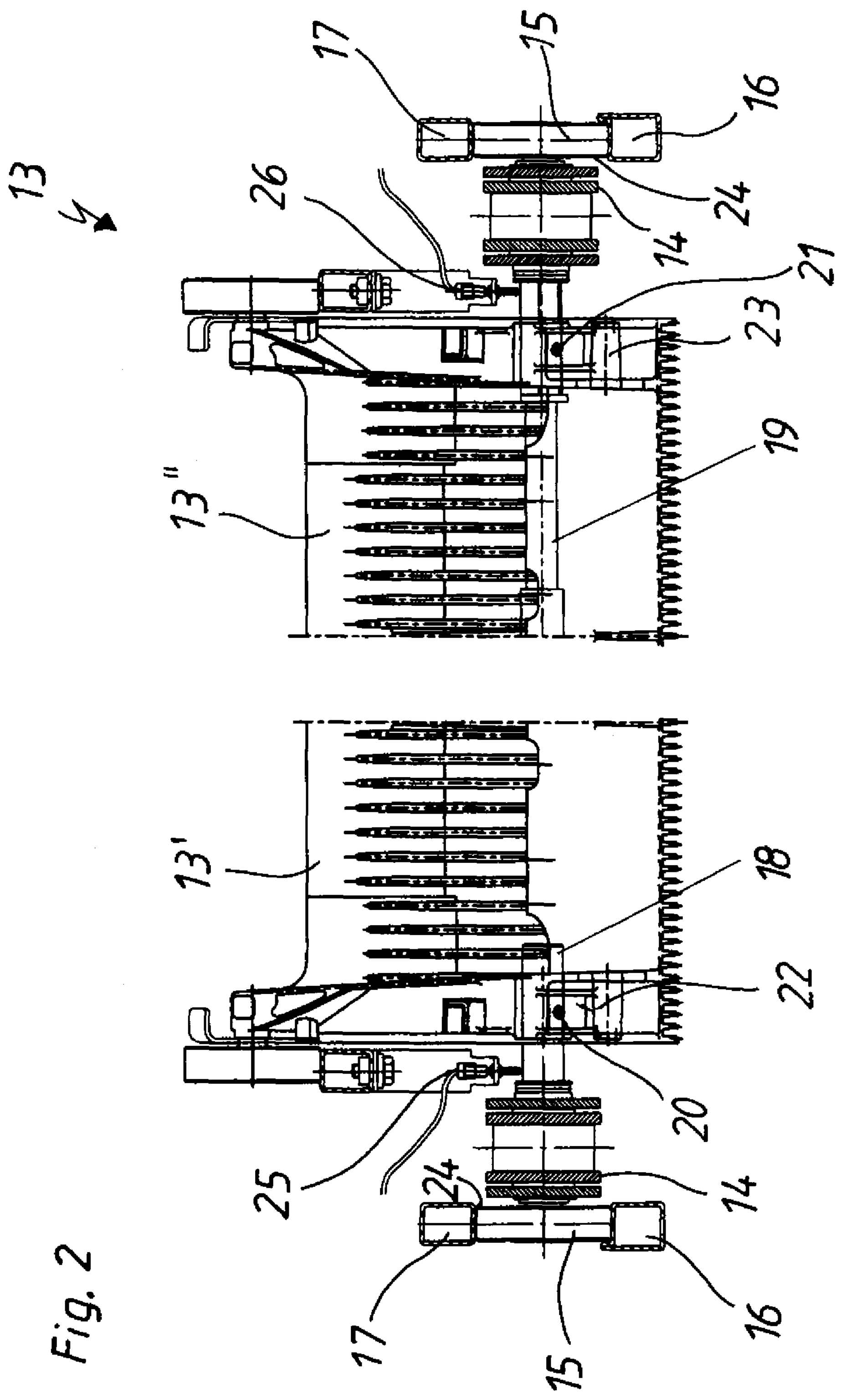
Figure 3:
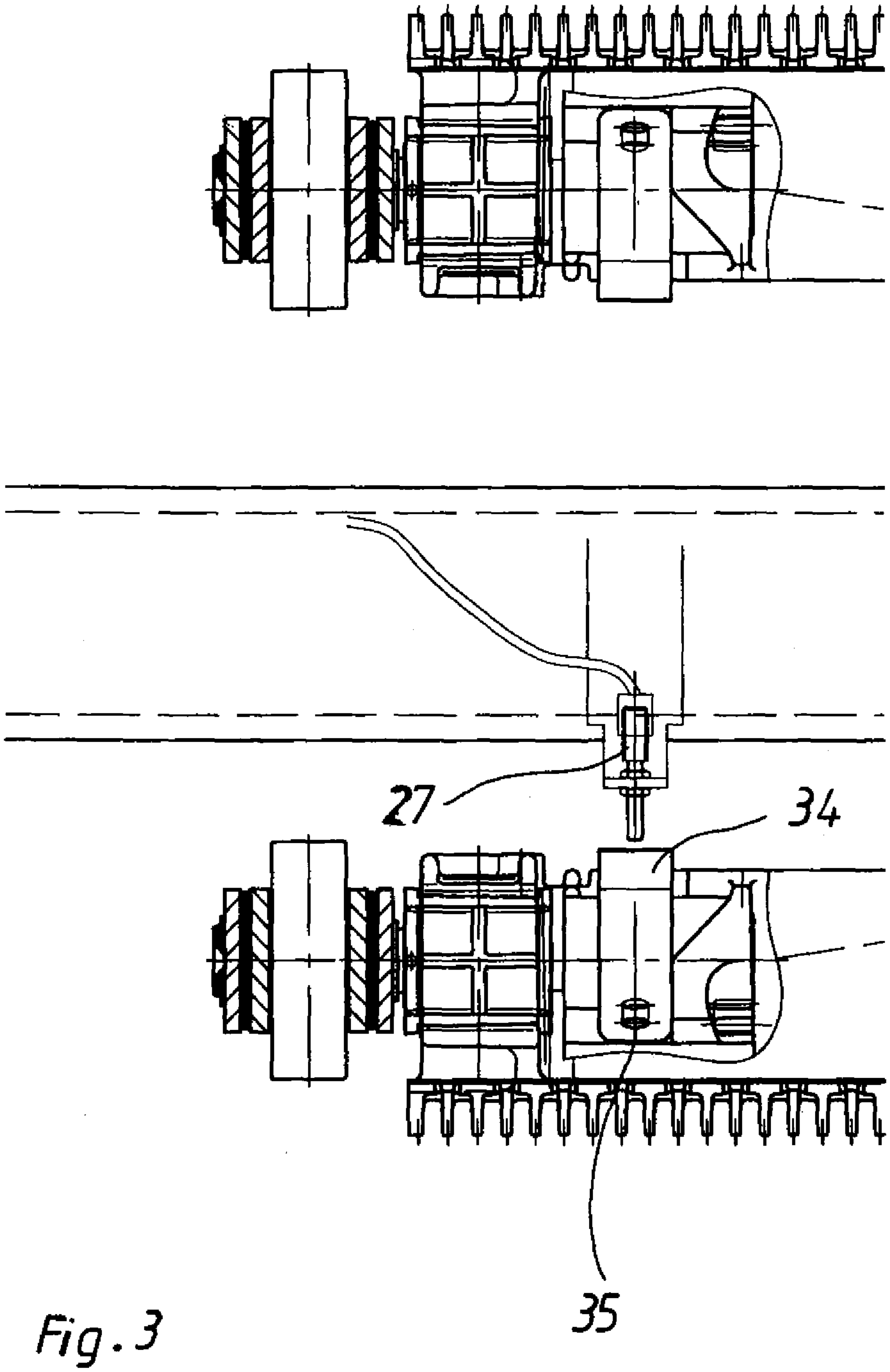
Figure 4:
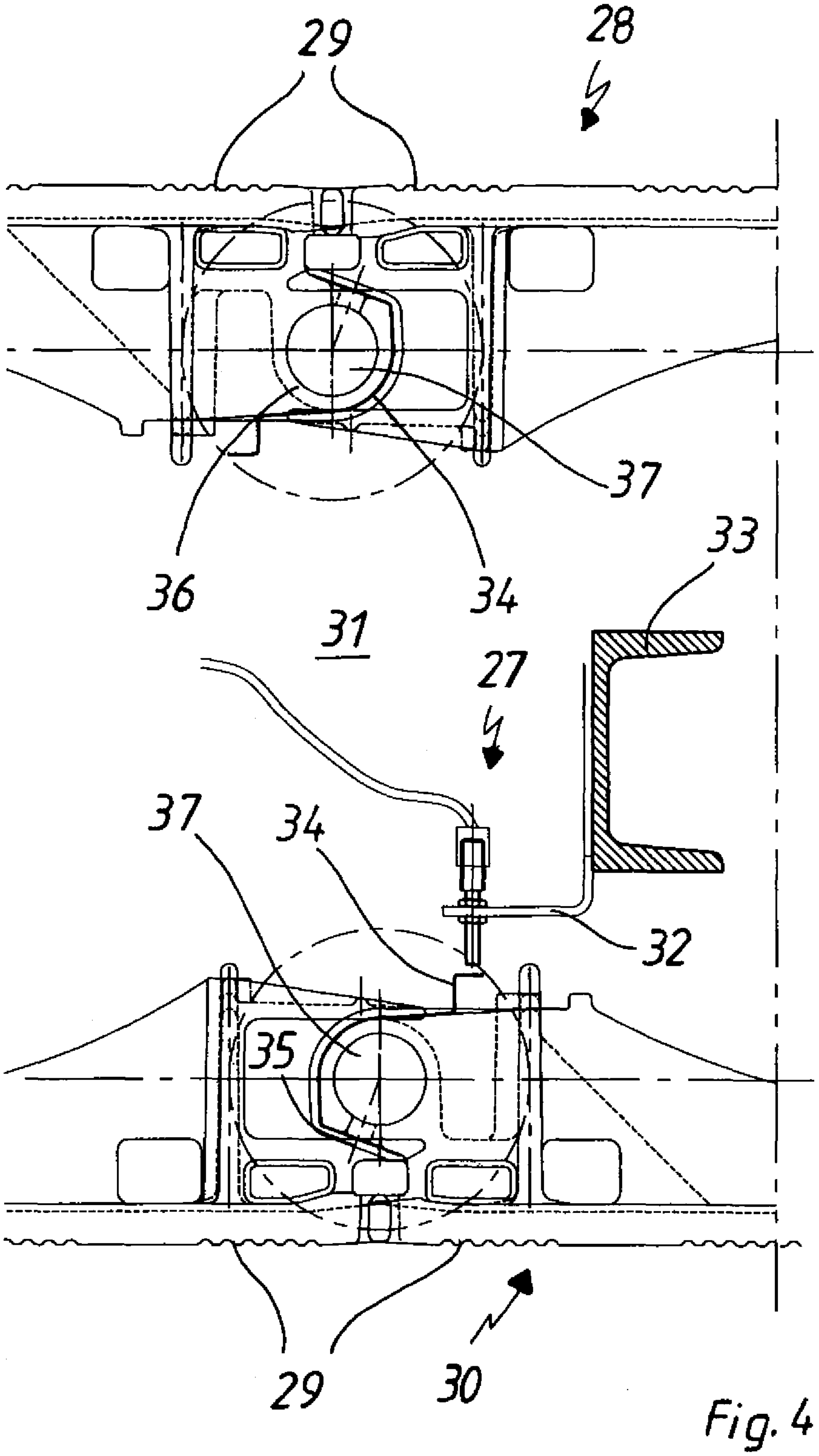
Figure 5:
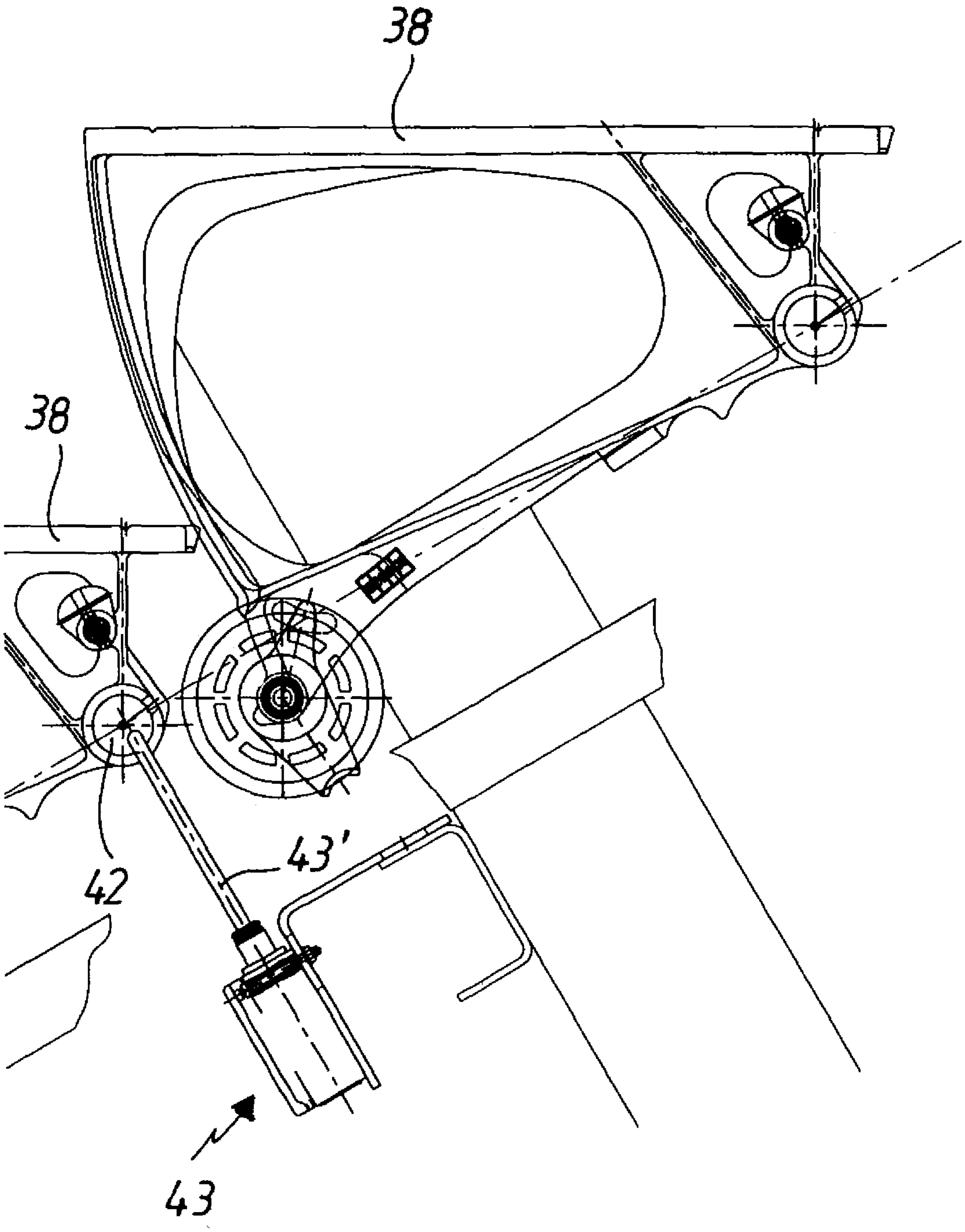
Figure 6:
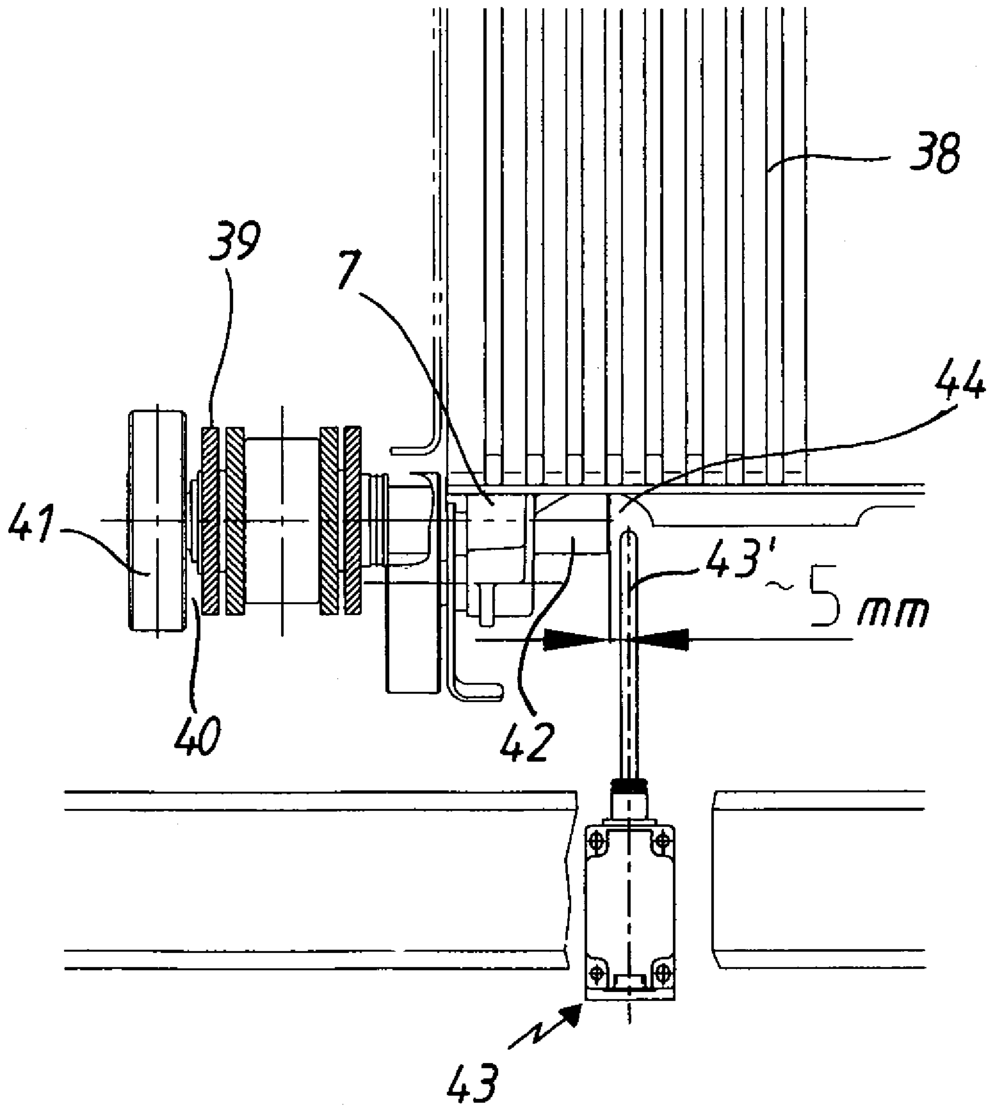

The subject matter of the invention is shown in the drawings using an exemplary embodiment and is described below. The drawings show as follows:

FIG. 1 a section through a step together with an illustration of different entraining elements connected to a safety device;

FIG. 2 a section through a step together with an illustration of different entraining elements connected to a safety device;

FIGS. 3 and 4 a section and a side view of a pallet belt together with a safety device;

FIGS. 5 and 6 a side view and detailed section of FIG. 1 together with a safety device.

FIG. 1 shows a section through a step 1 in the visible region of the step belt (forward motion) of a passenger transport installation (not shown in detail). In a mirror-image illustration one can see two step parts 1',1". One can also see a respective traction component 2 in the form of a plate link chain which is connected on the outside to a chain roller 4 by means of a chain pin 3. The chain pin 3 is connected to an entraining element 5, 6 on the side of the traction component 2 turned away from the chain roller 4. The entraining element 5 (left-hand part of FIG. 1) is in the form of a pin piece that passes through the step lug 7 of the step 1'. The pin piece 5 is connected to the step lug 7 by means of safety elements 8 that are only suggested. An axial relative movement between the chain pin 3 and the pin piece 5 is therefore not possible.

In the right part of FIG. 1 an entraining element in the form of a continuous axle 6 is shown. For better clarification reference is made to the subject matter of DE 296 03 962 U1. Similarly to the pin piece 5, the entraining element 6 in the form of a continuous axle is also connected to the corresponding step lug 10 by means of safety elements 9 that are only suggested. In this figure safety devices 11, 12, which are only suggested here, are in the form of mechanical buttons which will be described in more detail in the following figures.

Similarly to FIG. 1, FIG. 2 shows a step 13 in the return section, divided into step parts 13', 13". Here too traction components 14 in the form of plate link chains are provided which are operatively connected to chain rollers 15. In this example the chain rollers 15 are moved between guide elements 16, 17.

As already suggested in FIG. 1, in the left part of FIG. 2 a pin piece 18 is provided as an entraining element, while in the right part of FIG. 2 a continuous axle 19 is suggested as an entraining element. The respective entraining element 18, 19 is operatively connected by the corresponding step lug 22, 23 to the entraining element 18, 19 by means of safety elements 20, 21, which are also only suggested, so that axial relative movement between the chain pin 24 and the respective entraining element 18, 19 is not possible.

Here too safety devices 25, 26 are provided which, in this example, are provided as buttons that work in a contact-free manner and that are aligned to the circumferential surface of the respective entraining element 18, 19. As soon as the entraining element is moved out of its safety position, the button detects said movement when a threshold value is exceeded and can thus trigger the alarm. If an axial movement of the entraining element is detected, the triggering element should be disposed on the free end of the chain pin.

FIGS. 3 and 4 show another configuration in a sectional and side view of the arrangement of a safety device 27. One can see the transport section 28 for the pallets 29 and the return section 30 for the pallets 29.

The safety device 27 is provided in the non-visible region 31, i.e. between the transport section 28 and the return section 30, and is connected to a frame part 33 of the passenger transport installation by a holder 32. In order to give a better overview, only a single safety device 27 is shown here in the form of a button that works in a contact-free manner. In this example a moulded safety plate 34 is provided which is operatively connected on the one hand to the pallet lug 36 and on the other hand to the entraining element 37 by a screw 35. If this safety plate 34, to which the safety device 27 is aligned, has not been re-fitted following a repair or maintenance work, as the safety device 27 passes through the return section 30 the lack of safety plate 34 is detected and the drive of the passenger transport installation, which is not illustrated any further, is halted.

FIGS. 5 and 6 are also to be analysed similarly to FIGS. 1 and 2. One can see a respective step 38 here. One can also see a traction component 39 in the form of a plate link chain and a chain roller 41 connected to the traction component 39 by a pin 40. The chain pin 40 co-operates with a pin piece 42 as an entraining element. As described in the previous figures, the pin piece 42 is secured with respect to the step lug 7.

One can also see a safety device 43 in the form of a mechanical button 43' which, in this example, is positioned a defined distance, approx. 5 mm, behind the free end 44 of the pin piece 42.

If the lock between the step lug 7 and the pin piece 42 has not been re-established following maintenance or repair work, the pin piece 42 will slide out of its position as a result of the vibrations produced in the operating state of the passenger transport installation and finally come to rest against the button 43'. When the button 43' comes into contact with the end 44 of the pin piece 42 the drive of the passenger transport installation, not illustrated any further, will be halted immediately by the safety device 43.

| List of reference numbers |
|---|
| 1 step |
| 1' step part |
| 1" step part |
| 2 traction component |
| 3 chain pin |
| 4 chain roller |
| 5 entraining element (pin piece) |
| 6 entraining element (axle) |
| 7 step lug |
| 8 safety element (suggested) |
| 9 safety element (suggested) |
| 10 step lug |
| 11 safety device |
| 12 safety device |
| 13 step |
| 13' step part |
| 13" step part |
| 14 traction component |
| 15 chain roller |
| 16 guide element |
| 17 guide element |
| 18 pin piece (entraining element) |
| 19 axle (entraining element) |
| 20 safety element |
| 21 safety element |
| 22 step lug |
| 23 step lug |
| 24 chain pin |
| 25 safety devices |
| 26 safety devices |
| 27 safety device |
| 28 transport section |
| 29 pallet |
| 30 return section |
| 31 non-visible region |
| 32 holder |
| 33 frame part |
| 34 safety plate |
| 35 screw |
| 36 pallet lug |
| 37 entraining element |
| 38 step |
| 39 traction component |
| 40 chain pin |
| 41 chain roller |
| 42 pin piece (entraining element) |
| 43 safety device |
| 43' safety device |
| 44 end (pin piece) |

The invention claimed is:

1. A method for safeguarding the operation of a passenger transport installation, comprising the steps of:

monitoring of an entraining element that acts as a safety member between a traction component and a step or pallet of the passenger transport installation, there being disposed on the entraining element side a triggering element; and triggering an alarm when it is detected that a specifiable movement of the entraining element from its position safeguarding the connection between the traction component and the step has taken place, or when the lack of the entraining element is detected, wherein the triggering element is located between an end of the entraining element overlapped by the step or pallet and the traction component.

2. The method according to claim 1, wherein the specifiable movement that can be determined by the triggering element is a relative movement of the entraining element with respect to the step or pallet.

3. The method according to claim 1, wherein the alarm state includes the halting of the drive of the passenger transport installation.

4. The method according to claim 1, wherein the triggering element is a mechanical button which is positioned a specifiable distance away from the entraining element, the button detecting the specifiable movement of the entraining element when it comes into contact with the entraining element and triggering the alarm state.

5. The method according to claim 1, wherein the triggering element is a sensor that works in a contact-free manner and which is aligned to the circumferential surface of the entraining element and measures its movement as a specifiable path of the entraining element, and when this is exceeded or if the entraining element or a safety element provided to fix the latter in position is missing, triggers the alarm state.

6. The method according to claim 1, wherein the triggering element generates a frequency signal that identifies the counting rate of entraining elements per unit of time and the dependency of the operating speed of the passenger transport installation during operation of the latter and triggers the alarm state when there is a deviation from a specifiable frequency value.

7. A safety device of a passenger transport installation, comprising:

steps or pallets respectively connected to at least one traction component by means of an entraining element; and a triggering element that is disposed on the entraining element side such that when it is detected that a specifiable movement of the respective entraining element from its position safeguarding the connection between the traction component and the step has taken place, or when the lack of the entraining element is detected, the triggering element triggers an alarm state, wherein the triggering element is located between an end of the entraining element overlapped by the step or pallet and the traction component.

8. The safety device according to claim 7, wherein the triggering element is a mechanical button that is positioned a specifiable distance away from the entraining element.

9. The safety device according to claim 7, wherein the triggering element is a sensor working in a contact-free manner and which is aligned to the outer circumferential surface of the entraining element.

10. The safety device according to claim 7, wherein the triggering element is disposed by means of a holder in the non-visible region of the transport and/or return section of the steps or pallets.

11. The safety device according to claim 7, wherein the triggering of the alarm state includes the halting of the drive of the passenger transport installation.

12. The method according to claim 2, wherein the alarm state includes the halting of the drive of the passenger transport installation.

13. The method according to claim 2, wherein the triggering element is a mechanical button which is positioned a specifiable distance away from the entraining element, the button detecting the specifiable movement of the entraining element when it comes into contact with the entraining element and triggering the alarm state.

14. The method according to claim 3, wherein the triggering element is a mechanical button which is positioned a specifiable distance away from the entraining element, the button detecting the specifiable movement of the entraining element when it comes into contact with the entraining element and triggering the alarm state.

15. The method according to claim 2, wherein the triggering element is a sensor that works in a contact-free manner and which is aligned to the circumferential surface of the entraining element and measures its movement as a specifiable path of the entraining element, and when this is exceeded or if the entraining element or a safety element provided to fix the latter in position is missing, triggers the alarm state.

16. The method according to claim 3, wherein the triggering-element is a sensor that works in a contact-free manner and which is aligned to the circumferential surface of the entraining element and measures its movement as a specifiable path of the entraining element, and when this is exceeded or if the entraining element or a safety element provided to fix the latter in position is missing, triggers the alarm state.

17. The method according to claim 2, wherein the triggering element generates a frequency signal that identifies the counting rate of entraining elements per unit of time and the dependency of the operating speed of the passenger transport installation during operation of the latter and triggers the alarm state when there is a deviation from a specifiable frequency value.

18. The method according to claim 3, wherein the triggering element generates a frequency signal that identifies the counting rate of entraining elements per unit of time and the dependency of the operating speed of the passenger transport installation during operation of the latter and triggers the alarm state when there is a deviation from a specifiable frequency value.

19. The method according to claim 4, wherein the triggering element generates a frequency signal that identifies the counting rate of entraining elements per unit of time and the dependency of the operating speed of the passenger transport installation during operation of the latter and triggers the alarm state when there is a deviation from a specifiable frequency value.

20. The method according to claim 5, wherein the triggering element generates a frequency signal that identifies the counting rate of entraining elements per unit of time and the dependency of the operating speed of the passenger transport installation during operation of the latter and triggers the alarm state when there is a deviation from a specifiable frequency value.

* * * * *